US010496976B2

(12) United States Patent
Singh et al.

(10) Patent No.: US 10,496,976 B2
(45) Date of Patent: Dec. 3, 2019

(54) METHOD AND DEVICE FOR VALIDATING TRANSACTIONS PERTAINING TO SHARING OF SERVICES IN AD HOC NETWORK

(71) Applicant: Wipro Limited, Bangalore (IN)

(72) Inventors: Puneet Singh, Bangalore (IN); Deepika Ganesan, Nellore (IN); Pankaj Bande, Nagpur (IN)

(73) Assignee: Wipro Limited, Bangalore (IN)

( * ) Notice: Subject to any disclaimer, the term of this patent is extended or adjusted under 35 U.S.C. 154(b) by 359 days.

(21) Appl. No.: 15/070,559

(22) Filed: Mar. 15, 2016

(65) Prior Publication Data

US 2017/0255917 A1 Sep. 7, 2017

(30) Foreign Application Priority Data

Mar. 1, 2016 (IN) .............................. 201641007241

(51) Int. Cl.
| | |
|---|---|
| *G07G 1/12* | (2006.01) |
| *G06Q 20/20* | (2012.01) |
| *H04W 4/06* | (2009.01) |
| *H04W 4/14* | (2009.01) |
| *H04W 84/18* | (2009.01) |

(52) U.S. Cl.
CPC ............ *G06Q 20/209* (2013.01); *H04W 4/06* (2013.01); *H04W 4/14* (2013.01); *H04W 84/18* (2013.01)

(58) Field of Classification Search
CPC ............................ G06Q 20/209; H04W 84/18
USPC .................................................... 705/16, 24
See application file for complete search history.

(56) References Cited

U.S. PATENT DOCUMENTS

| | | | | |
|---|---|---|---|---|
| 9,679,489 | B2 * | 6/2017 | Lambert | ................ G08G 1/123 |
| 2009/0187488 | A1 * | 7/2009 | Shamilian | .............. G06Q 10/02 |
| | | | | 705/16 |

(Continued)

FOREIGN PATENT DOCUMENTS

| | | | |
|---|---|---|---|
| EP | 2624178 A1 * | 8/2013 | |
| EP | 2624178 A1 | 8/2013 | |

OTHER PUBLICATIONS

Holmes, D., "Ridecoin combines Uber and bitcoin in the ultimate troll against government oversight", Pando, Dec. 12, 2014, <https://pando.com/2014/12/12/ridecoin-combines-uber-and-bitcoin-in-the-ultimate-troll-against-government-oversight>.

(Continued)

*Primary Examiner* — Rokib Masud
(74) *Attorney, Agent, or Firm* — Pepper Hamilton LLP (57) ABSTRACT

The present disclosure discloses a device and a method for validating transactions pertaining to sharing of one or more services in an ad hoc network, comprising broadcasting amongst plurality of devices, a status message to other devices present in the ad-hoc network, where the plurality of devices comprises at least one service provider device and at least one service receiver device, identifying the at least one service receiver device based on the status message received from the other devices, sharing the one or more services with the at least one service receiver device, validating one or more transactions created by the at least one service provider device and updating a common transaction ledger with one or more validated transactions, where the updated one or more validated transactions are communicated to the other devices in the ad hoc network.

18 Claims, 4 Drawing Sheets

(56) References Cited

U.S. PATENT DOCUMENTS

| | | | | |
|---|---|---|---|---|
| 2009/0234658 A1* | 9/2009 | Greenwell | ............. | G06Q 30/02 |
| | | | | 705/13 |
| 2010/0053465 A1* | 3/2010 | Rogers | ................... | G08C 23/04 |
| | | | | 348/734 |
| 2014/0226487 A1* | 8/2014 | Forssell | ................ | H04W 36/22 |
| | | | | 370/235 |
| 2014/0370167 A1* | 12/2014 | Garden | ................. | G06Q 50/12 |
| | | | | 426/233 |

OTHER PUBLICATIONS

Mhougey, "Distributed peer to peer rideshare app", Ethereum, Feb. 2014, <https://forum.ethereum.org/discussion/212/distributed-peer-to-peer-rideshare-app>.

Schneider, N., "La'Zooz: The Decentralized, Crypto-Alternative to Uber", Shareable, Jan. 26, 2015, <http://www.shareable.net/blog/lazooz-the-decentralized-crypto-alternative-to-uber>.

* cited by examiner

METHOD AND DEVICE FOR VALIDATING TRANSACTIONS PERTAINING TO SHARING OF SERVICES IN AD HOC NETWORK

This application claims the benefit of Indian Patent Application Serial No. 201641007241 filed Mar. 1, 2016, which is hereby incorporated by reference in its entirety.

TECHNICAL FIELD

The present disclosure relates to field of data validation. More particularly and explicitly, the present disclosure relates to a method of validating transactions pertaining to sharing of one or more service amongst a plurality of devices in an ad hoc network.

BACKGROUND

In the current trend, electronic transactions are carried out as a routine. The electronic transactions need banks, card processors and digital wallet companies to act as trust agents. The trust agents ensure conformity in service delivery and maintenance of funds by payers. For example, bit-coins and similar virtual currencies provide such a capability in a global scenario where large number of devices is connected to Internet to settle transactions based on proof of work algorithms. However, the virtual currencies only ensure that the transactions are valid in terms of payer having enough balance to make a transaction. However, it is difficult to ascertain authenticity of transactions without a trust worthy central agent.

In a decentralized service sharing scenario, a user connected to a network having access to a particular service may share the service to other users connected to the network, requiring the service. But the existing systems for sharing services do not monitor and validate the amount of service shared. Further, the said systems cannot ensure that the service was delivered successfully. Hence, the user providing and receiving the service may not be able to track the amount of service shared. Further, the user may not be able to keep track of devices to or from which the service is shared or received.

SUMMARY

Embodiments of the present disclosure relate to a method and a device in an ad hoc network for validating transactions pertaining to sharing of one or more service amongst a plurality of devices in an ad hoc network. At least one service provider device amongst the plurality of devices shares the one or more service to at least one service receiver device amongst the plurality of devices. Further, the at least one service receiver device validates one or more transactions generated for the one or more service shared and the validated transactions are stored in a common transaction ledger connected to the ad hoc network. Thus, each of the plurality of devices can view the transactions, thereby enabling transparency in the one or more transactions.

In one embodiment, a method for validating transactions pertaining to sharing of one or more service amongst a plurality of devices in an ad hoc network, the method comprising broadcasting, by at least one device amongst the plurality of devices, a status message to other devices present in the ad-hoc network, where the plurality of devices comprises at least one service provider device and at least one service receiver device, identifying, by the at least one service provider device, the at least one service receiver device based on the status message received from the other devices, sharing, by the at least one service provider device, the one or more service with the at least one service receiver device, validating, by the at least one service receiver device, one or more transactions, where the one or more transactions are created by the at least one service provider device, for the at least one or more service shared and updating a common transaction ledger with the validated one or more validated transactions, wherein the updated one or more validated transactions are communicated to the other devices in the ad hoc network.

In an embodiment, a device in an ad hoc network for validating transactions pertaining to sharing of one or more service amongst a plurality of devices in the ad hoc network. The device comprises a processor and a memory communicatively coupled to the processor, where the memory stores processor-executable instructions, which, on execution, causes the processor to broadcast a status message to other devices present in the ad-hoc network, where the plurality of devices comprises at least one service provider device and at least one service receiver device, identify the at least one service receiver device based on the status message received from the other device, share the one or more service with the at least one service receiver device, validate one or more transactions, where the one or more transactions are created by the at least one service provider device, for the at least one or more service shared and update a common transaction ledger with the validated one or more validated transactions, wherein the updated one or more validated transactions are communicated to the other devices in the ad hoc network.

In an embodiment, a non-transitory computer readable medium including instructions stored thereon that when processed by at least one processor cause a device to perform operations comprising broadcasting a status message to other devices present in the ad-hoc network, where the plurality of devices comprises at least one service provider device and at least one service receiver device, identifying the at least one service receiver device based on the status message received from the other devices, sharing the one or more services with the at least one service receiver device, validating one or more transactions, where the one or more transactions are created by the at least one service provider device, for the at least one or more service shared and updating a common transaction ledger with the validated one or more validated transactions, where the one or more validated transactions are communicated to the other devices in the ad hoc network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and a device for validating transactions pertaining to sharing of one or more service amongst plurality of devices in an ad hoc network.

Figure 1:
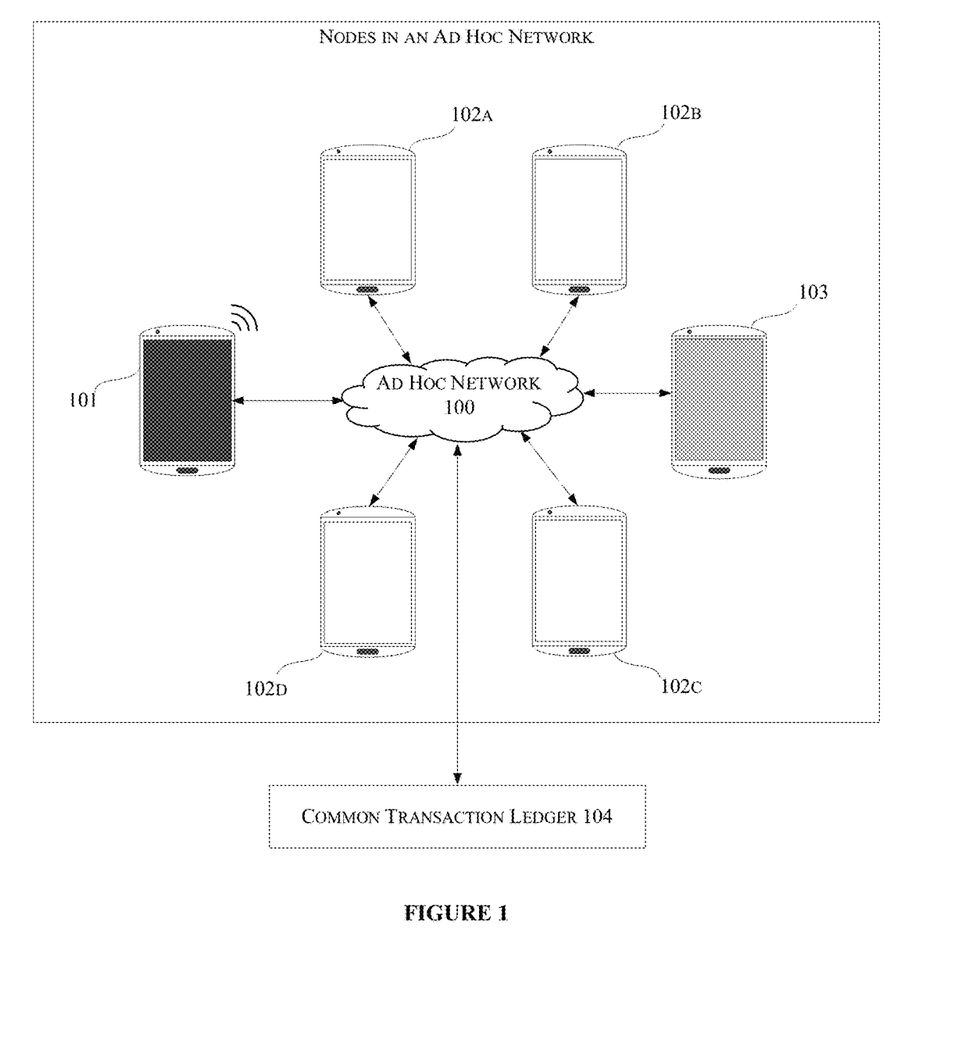
FIG. 1 shows an exemplary network diagram of plurality of devices in an ad hoc network for validating transactions pertaining to sharing of one or more service amongst the plurality of devices in the ad hoc network, in accordance with some embodiments of the present disclosure.

FIG. 1 of the present disclosure shows a network diagram of plurality of devices in an ad hoc network for validating transactions pertaining to sharing of one or more service amongst the plurality of devices in the ad hoc network. In an embodiment the network may be an ad hoc network 100. As shown in FIG. 1, the plurality of devices is connected to the ad hoc network 100. The plurality of devices comprises a communication device 101, a communication device 102A, a communication device 102B, a communication device 102C, a communication device 102D and a communication device 103. The said communication devices may be collectively represented as plurality of devices in the present disclosure. Further, the plurality of devices comprises at least one service provider device. For the purposes of illustration, let the communication device 101 be considered as the at least one service provider device 101. The service provider devices are the devices that provide one or more services to other communication devices 103. Similarly, let the communication device 103 be considered as the at least one service receiver device 103. The service receiver devices are the devices that receive the one or more services from at least one device among the other devices and the said communication device 103

As the plurality of devices is connected to the ad hoc network 100, each of the plurality of devices can communicate with rest of the plurality of devices through the ad hoc network 100. In one embodiment, each of the plurality of devices broadcasts a status message to other devices present in the ad hoc network 100. Further, each of the plurality of devices receives the status message broadcasted by each of the other devices. The status message may comprise at least one of a service availability data and type of service data. The status message is broadcasted by each of the plurality of devices within the ad hoc network 100 to indicate at least one of requirement of one or more services and provision of one or more services. In an exemplary embodiment, the at least one service provider device 101 broadcasts a status message to the other devices indicating provision of one or more services. Simultaneously, the at least one service provider device 101 may receive one or more status messages broadcasted by the other devices indicating at least one of requirement and provision of the one or more services. The at least one service provider device 101 identifies the at least one service receiver device 103 based on the one or more status messages received from the other devices. The identified at least one service receiver device 103 may require the service provided by the at least one service provider device 101. Further, the at least one service provider device 101 shares the one or more service with the at least one service receiver device 103. Also, the at least one service provider device 101 generates and transmits one or more transactions corresponding to the one or more services shared to the at least one service receiver device 103. Furthermore, the at least one service receiver device 103 validates one or more transactions generated by the at least the one service provider device 101 for the one or more service shared. Upon validating, the at least one service receiver device 103 transmits a proof of service message to the at least one service provider device 101, thereby confirming successful delivery of the services to the at least one service receiver device 103.

Also connected to the ad hoc network 100 is the common transaction ledger 104. In an embodiment, the common transaction ledger 104 may be a database to store data. The common transaction ledger 104 is connected to the ad hoc network 100, thereby providing access to each of the plurality of devices. The one or more transactions generated by the at least one service provider device 101 is updated in the common transaction ledger 104 by at least one device among the plurality of devices. In an exemplary embodiment, selection of the at least one device to update the one or more transactions in the common transaction ledger is based on at least one of a round robin mining and probabilistically.

In an embodiment, the one or more transactions comprises at least one of type of services shared, duration of service, charges for service shared, and device identifier (ID) of the at least one service receiver device. The type of services may include but are not limited to Internet data service, Short Message Service (SMS), Global Positioning System (GPS) service, time stamp, etc. In an embodiment, the service availability data may comprise availability status for each of the type of services, amount if service requested, amount of service available, etc.

Figure 2:
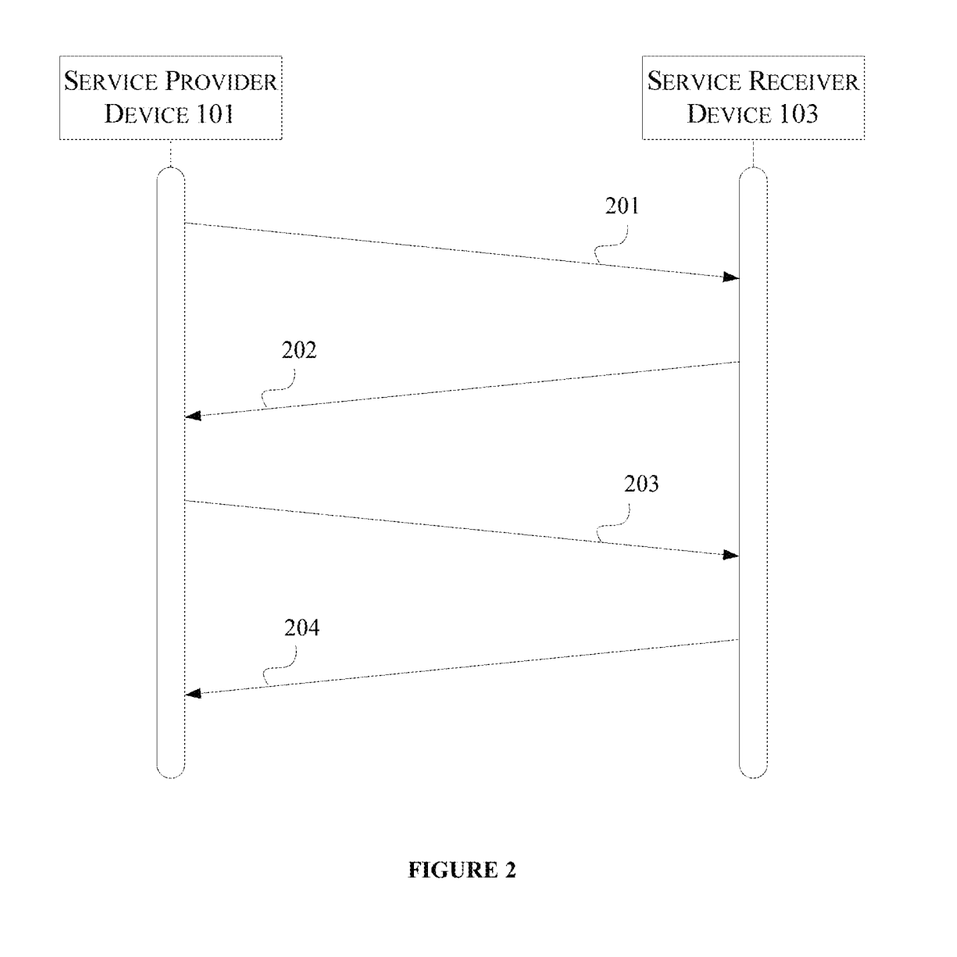
FIG. 2 illustrates a sequence diagram illustrating communication between service provider device and service receiver device for validating transactions pertaining to sharing of one or more service amongst plurality of devices in an ad hoc network, in accordance with some embodiments of the present disclosure.

FIG. 2 of the present disclosure illustrates communication between service provider device and service receiver device for validating transactions pertaining to sharing of one or more service amongst plurality of devices in an ad hoc network, in accordance with some embodiments of the present disclosure. As described above, each of the plurality of devices broadcasts a status message to other devices present in the ad hoc network 100. In one implementation, the at least one service provider device 101 broadcasts the status message indicating availability of one or more service for sharing, to other devices in the ad hoc network 100. Further, at least one device amongst the plurality of devices may require the one or more services. Let the at least one service receiver device 103 be the at least one device requiring the one or more services. The at least one service receiver device 103 broadcasts a status message indicating requirement of the one or more services. In an embodiment, let the status message broadcasted by the at least one service provider device 101 be denoted as first status message. Similarly, let the status message broadcasted by the at least one service receiver device 103 be denoted as second status message.

As shown in FIG. 2, the at least one service provider device 101 broadcasts the first status message 201 to the other devices. In one embodiment, the broadcasted first status message 201 is received by the at least one service receiver device 103. The at least one service receiver device 103 examines the received first status message 201 for availability status of the required one or more services. Upon confirming service availability of the one or more services, the at least one service receiver device 103 acknowledges the first status message 201 by transmitting the second status message 202 to the other devices. Then, the at least one service provider device 101 identifies the at least one service receiver device 103 upon receiving the second status message 202. Further, the at least one service provider device 101 shares the service with the at least one service receiver device 103. Also, the at least one service provider device 101 generates one or more transactions for the shared service. The at least one service provider device 101 transmits the one or more transactions to the at least one service receiver device 103 along with the shared service. The transmission of the one or more transactions to the at least one service receiver device 103 is denoted by 203 in FIG. 2. Then, the at least one service receiver device 103 validates the one or more transactions based on the received service. Upon validating the one or more transactions, the at least one receiver device 103 transmits a proof of service message to the at least one service provider device 101. The transmission of proof of message is denoted by 204 in the FIG. 2.

Then, the one or more transactions are stored in the common transaction ledger 104 based on the proof of service message 204.

In one embodiment, the one or more transactions are generated and transmitted to the at least one service receiver device 103 at predefined intervals of the service shared. Further, the at least one service receiver device 103 validates the one or more transactions at every predefined intervals of transmission of the said one or more transactions. The one or more transactions may comprise information relating to amount of service shared, amount of time consumed for the shared one or more services, etc.

In one embodiment, the proof of service message 204 comprises validation result. The validation result can either be a successful validation or unsuccessful validation. After receiving the proof of service message 204, the at least one service provider device 101 adds one or more validated transactions from the one or more transactions to a queue (not shown in figure), based on priority assigned to the service corresponding to the one or more transactions. Here, the one or more validated transactions are the transactions that are successfully validated by the at least one service receiver device 103. Further, the one or more validated transactions are updated in the common transaction ledger 104 by at least one device among the plurality of devices. In a non-limiting embodiment, the at least one device is selected based on at least one of a Round Robin Mining and probabilistically. The plurality of devices in the ad hoc network 100 may have access to the common transaction ledger 104 and each of the plurality of devices can view the contents of the common transaction ledger 104.

In an embodiment, the at least one service provider device 101 transmits a payment message to the at least one service receiver device 103 for the service shared with the at least one service receiver device 103. The payment message details are stored in the common transaction ledger 104.

Figure 3:
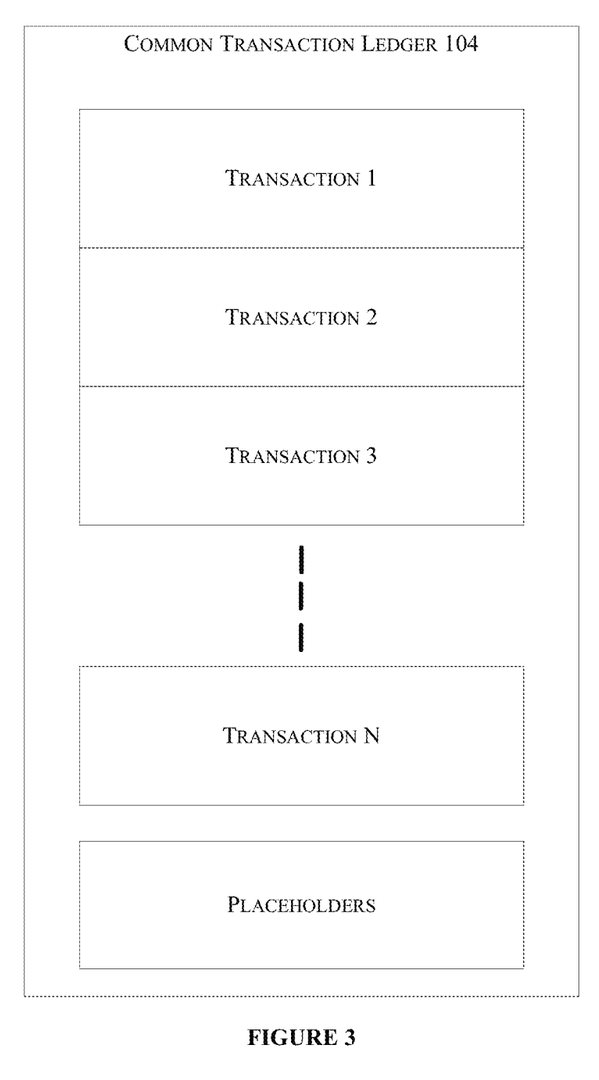
FIG. 3 shows an exemplary representation of a transaction ledger connected to the ad hoc network in accordance with some embodiments of the present disclosure.

FIG. 3 shows a common transaction ledger 104 for storing the one or more transactions corresponding to the one or more service shared amongst the plurality of devices in the ad hoc network 100.

Figure 4:
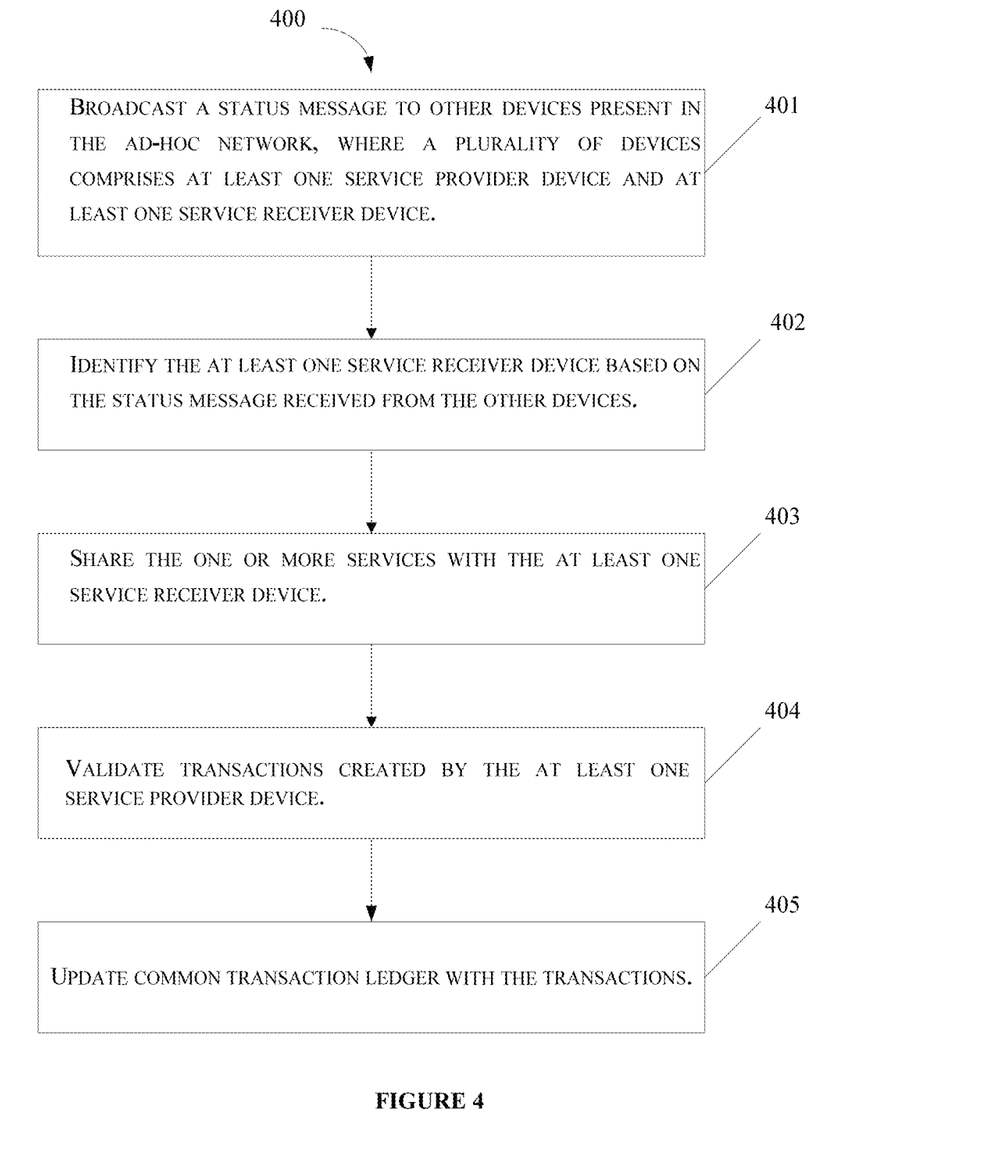
FIG. 4 shows a flowchart illustrating a method for validating transactions pertaining to sharing of one or more service amongst plurality of devices in an ad hoc network, in accordance with some embodiments of the present disclosure.

FIG. 4 shows a flowchart illustrating a method for validating one or more transactions pertaining to sharing of one or more service amongst a plurality of devices in an ad hoc network 100.

As illustrated in FIG. 4, the method 400 may comprise one or more steps for validating one or more transactions. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 401, broadcast a status message to other devices present in the ad hoc network 100. Each of the plurality of devices in the ad hoc network 100 broadcasts a status message to other devices in the ad hoc network. In an embodiment, the plurality of devices comprises at least one service provider device 101 and at least one service receiver device 103. The status message at least one of a service availability data and type of service data. In an exemplary embodiment, the at least one service provider device 101 broadcasts the first status message 201 indicating availability of one or more service for sharing to other devices in the ad hoc network 100. Further, the at least one service receiver device 103 broadcasts a second status message 202 indicating requirement of the service among the one or more services.

At step 402, identify by the at least one service provider device 101 the at least one service receiver device 103 based on the status message received from the other devices. Here, the at least one service receiver device 103 receives the first status message 201 and examines the said first status message 201 for availability status of the required service among the one or more services. Upon confirming service availability of the service, the at least one service receiver device 103 acknowledges the first status message 201 by transmitting the second status message 202 to the other devices. Then, the at least one service provider device 101 identifies the at least one service receiver device 103 upon receiving the second status message 202.

At step 403, share the service among the one or more services with the at least one service receiver device 103. Here, the at least one service provider device 101 shares the service with the at least one service receiver device 103. Also, the at least one service provider device 101 generates one or more transactions corresponding to the service shared. Further, the at least one service provider device 101 transmits the one or more transactions to the at least one receiver device 103.

At step 404, validating by the at least one service receiver device 103, the one or more transactions based on the received service. In an embodiment, the one or more transactions are generated at predefined intervals of the service shared. After validating the one or more transactions, the at least one service receiver device 103 transmits the proof of service message to the at least one service provider device 101. Here, the at least one service receiver device 103 validates the one or more transactions at every predefined intervals of generation of the said one or more transactions. In an embodiment, predefined amount of the one or more transactions may be validated and rest of the one or more transactions may not be validated. The predefined amount of the one or more transactions validated may be denoted as one or more validated transactions. The one or more validated transactions are added to the queue by the at least one service provider device 101 based on priority assigned to the service corresponding to the one or more transactions.

At step 405, updating by at least one device among the plurality of devices, the one or more validated transactions in the common transaction ledger 104. The at least one device is selected based on at least one of a Round Robin Mining and probabilistically. The plurality of devices in the ad hoc network 100 may have access to the common transaction ledger 104 and each of the plurality of devices can view the contents of the common transaction ledger 104.

For example, consider six devices connected to the ad hoc network 100 as shown in FIG. 1 of the present disclosure. Here, each of the six devices broadcasts a status message to remaining five devices indicating either requirement of one or more services or provision of one or more services. In an embodiment, let the communication device 101 broadcast a first status message indicating provision of Internet service to the remaining five devices. Further, let the communication device 101 receive one or more status messages from the communication device 103, communication device 102A, communication device 102B, communication device 102C and communication device 102D indicating either requirement or provision of one or more services. Further, let the communication device 103 indicate requirement of Internet service in the broadcasted status message. Upon receiving the status message from the communication device 103, the communication device 101 identifies the communication device 103 as at least one service receiver device 103. Let the communication device 101 be represented as at least one service provider device 101. Then, the at least one service provider device 101 shares the Internet service with the at least one service receiver device 103. Simultaneously, the at least one service provider device 101 generates one or more transactions corresponding to the shared internet service at predefined intervals. Here, the one or more transactions may be generated at predefined intervals of at least one of, amount of Internet data shared, time consumption for the shared Internet data, etc. Further, the one or more transactions are transmitted to the at least one service receiver device 103 at the predefined intervals. The at least one service receiver device 103 validates the one or more transactions based on the received Internet service. In an embodiment, the at least one service receiver device 103 validates the one or more transactions at predefined intervals. For each of the one or more validated transactions, the at least one service receiver device 103 transmits a proof of service message to the at least one service provider device 101. For purpose of illustration, let 100 Mega Bytes (MB) of Internet data be shared by the at least one service provider device 101. Let the one or more transactions be generated and transmitted to the at least one service receiver device 103 for every 10 MB of Internet data shared. Consider a scenario where only 40 MB of Internet data is shared with the at least one service receiver device 103. Therefore, the at least one service receiver device 103 validates the one or more transactions corresponding to the 40 MB of received Internet data. Further, the at least one service receiver device 103 transmits a proof of message to the at least one service provider device 101 corresponding to one or more validated transactions. The at least one service provider device 101 receives the proof of message thereby receiving a confirmation that only 40 MB of Internet data has been shared. Accordingly, the at least one service provider device 101 adds the one or more validated transactions to a queue based on priority. Furthermore, at least one device among the five devices is selected to update the one or more validated transactions in the common transaction ledger 104. The common transaction ledger 104 is connected to the ad hoc network 100. Thus, each of the five devices in the ad hoc network 100 can access the common transaction ledger 104.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show a certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

TECHNICAL ADVANTAGES OF THE PRESENT INVENTION

In an embodiment, the method disclosed in the present disclosure allows a user to use services by connecting to devices capable of sharing the services through an ad hoc network. When a user does not have access to a service, the user can receive the service by receiving the service from other users.

In an embodiment, the present disclosure discloses a method of validating transactions pertaining to shared services among plurality of devices in an ad hoc network.

In an embodiment, the validated transactions are updated in a common transaction ledger accessible by each of the plurality of devices in the ad hoc network. Thereby, the proposed method enables transparency in the transactions.

In an embodiment, the user can utilize a particular type of service and can make payment only for the amount of service used. Further, the proposed method eliminates a central agent for making and validating transactions.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Ad hoc network |
| 101 | Service provider device |
| 103 | Service receiver device |

What is claimed is:

1. A method of validating transactions pertaining to sharing of one or more services amongst a plurality of devices in an ad hoc network, comprising:

broadcasting, by at least one service provider device amongst the plurality of devices, a status message to other devices present in the ad-hoc network, wherein the plurality of devices comprises the at least one service provider device and at least one service receiver device, and wherein each of the plurality of devices have access to a common transaction ledger;

identifying, by the at least one service provider device, the at least one service receiver device based on the status message received from the other devices;

sharing, by the at least one service provider device, the one or more services with the at least one service receiver device, wherein one of the one or more services comprises one or more megabytes of internet data;

receiving, by the at least one service provider device, a validation for one or more transactions for the at least one or more service shared from the at least one service receiver device, wherein the validation is received for each of the one or more transactions utilizing a portion of the one or more megabytes of internet data; and updating, by the at least one service provider device, the common transaction ledger with the validated one or more transactions, wherein the updated one or more transactions are communicated to the other devices in the ad hoc network.

2. The method as claimed in claim 1, wherein the one or more services comprises at least one of Global Positioning System (GPS) services, Short Message Service (SMS), time stamps and data services.

3. The method as claimed in claim 1, wherein the status message comprises at least one of service availability and type of services.

4. The method as claimed in claim 1, wherein the common transaction ledger comprises transaction data corresponding to the one or more transactions completed in the ad hoc network, and wherein the transaction data comprises at least one of type of services shared, duration of service, charges for service, and device identifier (ID) of the at least one service receiver device.

5. The method as claimed in claim 1, wherein updating the common transaction ledger comprises:

adding, by the at least one service provider device, the transactions to a predefined queue based on a priority assigned to the one or more services corresponding to the transactions; and receiving, by the at least one service provider device, a proof of service from the at least one service receiver device to validate the transactions.

6. The method as claimed in claim 1, wherein the at least one device to update the one or more transactions is selected based on one of a round robin mining and probabilistically.

7. A device comprising:

a processor; and a memory communicatively coupled to the processor, wherein the memory stores processor-executable instructions, which, on execution, causes the processor to:

broadcast a status message to other devices present in the ad-hoc network, wherein the plurality of devices comprises the at least one service provider device and at least one service receiver device, and wherein each of the plurality of devices have access to a common transaction ledger;

identify the at least one service receiver device based on the status message received from the other devices;

share the one or more services with the at least one service receiver device, wherein one of the one or more services comprises one or more megabytes of internet data;

receive a validation for one or more transactions for the at least one or more service shared from the at least one service receiver device, wherein the validation is received for each of the one or more transactions utilizing a portion of the one or more megabytes of internet data; and update the common transaction ledger with the validated one or more transactions, wherein the updated one or more transactions are communicated to the other devices in the ad hoc network.

8. The device as claimed in claim 7, wherein the one or more services comprises at least one of Global Positioning System (GPS) services, Short Message Service (SMS), time stamps and data services.

9. The device as claimed in claim 7, wherein the status message comprises at least one of service availability and type of services.

10. The device as claimed in claim 7, wherein the common transaction ledger comprises transaction data corresponding to the one or more transactions completed in the ad hoc network, and wherein the transaction data comprises at least one of type of services shared, duration of service, charges for service, and device identifier (ID) of the at least one service receiver device.

11. The device as claimed in claim 7, wherein the common transaction ledger is updated by the processor, further configured to:

add the transactions to a predefined queue based on a priority assigned to the one or more services corresponding to the transactions; and receive a proof of service from the at least one service receiver device to validate the transactions.

12. The device as claimed in claim 7, wherein the at least one device to update the one or more transactions is selected based on one of a round robin mining and probabilistically.

13. A non-transitory computer readable medium including instructions stored thereon that when processed by at least one processor cause a device to perform operations comprising:

broadcasting a status message to other devices present in the ad-hoc network, wherein the plurality of devices comprises the at least one service provider device and at least one service receiver device, and wherein each of the plurality of devices have access to a common transaction ledger;

identifying the at least one service receiver device based on the status message received from the other devices;

sharing the one or more services with the at least one service receiver device, wherein one of the one or more services comprises one or more megabytes of internet data;

receiving a validation for one or more transactions for the at least one or more service shared from the at least one service receiver device, wherein the validation is received for each of the one or more transactions utilizing a portion of the one or more megabytes of internet data; and updating the common transaction ledger with the validated one or more transactions, wherein the updated one or more transactions are communicated to the other devices in the ad hoc network.

14. The medium as claimed in claim 13, wherein the one or more services comprises at least one of Global Positioning System (GPS) services, Short Message Service (SMS), time stamps and data services.

15. The medium as claimed in claim 13, wherein the status message comprises at least one of service availability and type of services.

16. The medium as claimed in claim 13, wherein the common transaction ledger comprises transaction data corresponding to the one or more transactions completed in the ad hoc network, and wherein the transaction data comprises at least one of type of services shared, duration of service, charges for service, and device identifier (ID) of the at least one service receiver device.

17. The medium as claimed in claim 13, wherein the instructions causes the processor to update the common transaction ledger, the operations comprises:

adding the transactions to a predefined queue based on a priority assigned to the one or more services corresponding to the transactions; and receiving a proof of service from the at least one service receiver device to validate the transactions.

18. The medium as claimed in claim 13, wherein the at least one device to update the one or more transactions is selected based on one of a round robin mining and probabilistically.

* * * * *